(12) United States Patent
Reif

(10) Patent No.: US 12,465,645 B2
(45) Date of Patent: Nov. 11, 2025

(54) ANTI-VIRAL COMPOSITION AND METHOD FOR PREPARING THE SAME

(71) Applicant: Alexia Reif, Stockton, CA (US)

(72) Inventor: Alexia Reif, Stockton, CA (US)

(*) Notice: Subject to any disclaimer, the term of this patent is extended or adjusted under 35 U.S.C. 154(b) by 0 days.

(21) Appl. No.: 17/711,510

(22) Filed: Apr. 1, 2022

(65) Prior Publication Data
US 2023/0310612 A1    Oct. 5, 2023

(51) Int. Cl.
| | |
|---|---|
| *A61K 47/34* | (2017.01) |
| *A61K 8/9783* | (2017.01) |
| *A61K 9/00* | (2006.01) |
| *A61K 45/06* | (2006.01) |
| *A61P 31/22* | (2006.01) |

(52) U.S. Cl.
CPC ............ *A61K 47/34* (2013.01); *A61K 8/9783* (2017.08); *A61K 9/0014* (2013.01); *A61K 45/06* (2013.01); *A61P 31/22* (2018.01)

(58) Field of Classification Search
CPC .... A61K 45/06; A61K 8/9783; A61K 9/0014; A61K 47/34; A61K 8/9789; A61K 31/192; A61K 31/216; A61K 31/525; A61K 2300/00; A61K 2236/331; A61K 2236/37; A61K 9/006; A61K 36/53; A61P 31/22
See application file for complete search history.

(56) References Cited

U.S. PATENT DOCUMENTS

| | | |
|---|---|---|
| 8,846,114 B1 | 9/2014 | Makela |
| 11,191,795 B2 | 12/2021 | Carrasco Nino |
| 2013/0059019 A1* | 3/2013 | Leighton ................. A61P 31/04 424/736 |

FOREIGN PATENT DOCUMENTS

WO    WO-2019055119 A1 *    3/2019    ............. A61K 31/19

OTHER PUBLICATIONS

Shiwakoti et al., Yield, Composition and Antioxidant Capacity of the Essential Oil of Sweet Basil and Holy Basil as Influenced by Distillation Methods, Chemistry & Biodiversity, vol. 14, 1-6, 2017 (Year: 2017).*
Chiang et al., Antiviral activities of extracts and selected pure constituents of Ocimum basilicum, Clinical and Experimental Pharmacology and Physiology, vol. 32, 811-816, 2005 (Year: 2005).*
Pandey et al., A rapid and highly sensitive method for simultaneous determination of bioactive constituents in leaf extracts of six Ocimum species using ultra high performance liquid chromatography-hybrid linear ion trap triple quadrupole mass spectrometry, Analytical Methods, vol. 8, Dec. 1, 2015 (Year: 2015).*

(Continued)

*Primary Examiner* — Sarah Pihonak
*Assistant Examiner* — Padmaja S Rao

(57) ABSTRACT

A composition and some methods for preparing the same are disclosed. The methods result in the extraction of a wide array of polyphenols and triterpenes. The resulting composition is a mixture rich in anti-viral, antioxidant, and anti-inflammatory ingredients that may be administered in various forms or methods of application or composition. Further, the composition of the present invention is used in the treatment or prevention of herpes simplex virus (HSV), aphthous, and other mouth ulcers.

15 Claims, 6 Drawing Sheets

(56) References Cited

OTHER PUBLICATIONS

Hamedi et al., The Most Common Herbs to Cure the Most Common Oral Disease: Stomatitis Recurrent Aphthous Ulcer (RAU), Iranian Red Crescent Medical Journal, vol. 18, No. 2,Feb. 13, 2016 (Year: 2016).*
PubChem Compound Summary for CID 6454041, Esculentoside P, National Center for Biotechnology Information, 2006 (Year: 2006).*
PubChem Compound Summary for CID 14658050, arjunglucoside I, National Center for Biotechnology Information, 2007 (Year: 2007).*
Yang-Hua et al., A New Terpenoid and its Glycoside from Phytolacca esculenta, Planta Medica, vol. 57, 162-164, 1991 (Year: 1991).*
Tian et al., Triterpenoid saponins from Pterocephalus hookeri, Phytochemistry, vol. 32, No. 6, 1535-15381993 (Year: 1993).*
Ghasemzadeh et al., Improvement in Flavonoids and Phenolic Acids Production and Pharmaceutical Quality of Sweet Basil (*Ocimum basilicum* L.) by Ultraviolet-B Irradiation, Molecules, vol. 21, 1-15, Sep. 9, 2016 (Year: 2016).*
Tzeng, NS, et al., "Anti-herpetic Medications and Reduced Risk of Dementia in Patients with Herpes Simplex Virus Infections—a Nationwide, Population-Based Cohort Study in Taiwan" (Neurotherapeutics, 2018, 15 (2): 417-429) doi:10.1007/s13311-018-0611-x.
World Health Organization, "Massive proportion of world's population are living with herpes infection" (WHO, May 1, 2020) https://www.who.int/news/item/01-05-2020-massive-proportion-world-population-living-with-herpes-infection.

* cited by examiner

500

Cytotoxic Concentration Of Compounds Against Vero Cells

FIG. 5

ANTI-VIRAL COMPOSITION AND METHOD FOR PREPARING THE SAME

FIELD OF THE INVENTION

The present invention generally relates to anti-viral compositions. More specifically, the present invention relates to an anti-viral composition based upon constituents isolated from or contained within that of *Ocimum basilicum* as well as a process for preparing the anti-viral composition that is useful in reducing herpes simplex virus (HSV) and treating viral infections, aphthous and other mouth ulcers.

BACKGROUND

Herpes, a viral infection, is caused by the herpes simplex virus (HSV). There are eight different types of herpes virus (HSV type 1-HSV type 8). This virus can cause life-long infections in humans and can either be in a lytic (productive) form or remain in a dormant state. HSV establishes latency in neuronal ganglia in neuronal ganglia cells to avoid detection by the immune system. In the inactive form, it can reactivate itself depending on various related host factors such as fatigue, stress, hormonal changes, or exposure to extreme weather conditions. The herpes virus causes cold sores, or "fever blisters," on genitals or the mouth, which may also spread, for example, to the eyes and fingertips; HSV type 1 most commonly infects the lips, while HSV type 2 usually causes sores around the genital area. Sores can also appear around broken skin—the transmissibility rate increases when active sores are present. The World Health Organization (WHO) has associated HSV type 2 infections with an increased risk of HIV infection. The WHO considers HSV such a concern that it advocates for, and accelerates further, HSV education, prevention, control, and treatment including the development of HSV vaccines and topical microbicides. HSV type 3 causes chickenpox and is also known as a varicella-zoster virus. Its pathology is quite similar to HSV type 1 where it infects skin and nerve cells and causes a recurrent virus infection, commonly known as shingles. The CDC estimates, one out of every three people in the United States, will develop shingles in their lifetime. HSV type 4 and HSV type 5 cause infectious mononucleosis. HSV type 6 and HSV type 7 cause roseola, which is high fever, skin rash, and febrile seizures. HSV type 8, also known as Kaposi's Sarcoma, is rare and is normally found in AIDS patients. HSV type 8 causes the development of purplish skin tumors or skin cancer.

Canker sores, also known as mouth ulcers or aphthous ulcers are ulcers that form on the mucous membrane of the mouth. They appear as whitish or grayish, slightly sunken round lesions inside a raised red perimeter. The sores are painful, can interfere with eating and liquid intake and even speaking, but typically heal on their own in one to two weeks, though some ulcers may take up to 4 weeks to heal and some individuals may endure near-continuous ulcer activity. The etiology of aphthous ulcers remains unclear, but contributing factors may include stress, hormones, Vitamin B, folate, iron, or zinc deficiency, food sensitivities, Helicobacter pylori, and use of oral hygiene products containing sodium lauryl sulfate. Additionally, physical trauma of the mouth (for example accidentally biting a cheek, poking your tongue with a fork, etc.) may catalyze the sores in susceptible individuals. Sores may also be associated with underlying conditions or the immunocompromised (for example, individuals with HIV, Celiac disease, Behcet's disease). Recurrent aphthous ulcers are the most common oral mucosal disease in North America. Estimates on prevalence vary, with lifetime adult prevalence in the United States and Canada cited as between 46.4 and 69.4% of the population. Most available treatments for canker sores focus on ameliorating pain and discomfort (corticosteroids, benzocaine) but the reduction in healing time is inconsistent or insignificant according to the literature. Canker sores differ from cold sores, including in that they appear within the mouth rather than on the labia or other parts of the body, are not caused by HSV, and are not known to be contagious. However, modes of treatment for the two types of sores are sometimes similar—for example analgesics and lasers. Laser treatment has been used to reduce pain and healing time of recurrent aphthous stomatitis ulcers (according to a study conducted by Khademi et al, the healing time in the laser group was 5±1.41 days as compared to 8.25±0.96 days in the sham group) but can be costly and may only be available through a dental professional or at a cost of hundreds of dollars for a consumer device. As such, there is a need for safe, effective, and affordable alternatives. The present invention satisfies these and other needs. A further similarity between canker sores and HSV lesions is the difficulty studying them in human clinical studies due to their rapid onset, relatively short normal duration period, and the window for the effective therapeutic intervention being relatively narrow.

There are various patents relating to the treatment of the herpes simplex virus (HSV). Few existing patent references attempted to address the problems cited in the background as prior art over the presently disclosed subject matter and are explained as follows:

A prior art U.S. Pat. No. 8,846,114 assigned to Makela, et. al., entitled "Composition for the treatment of herpes and cold sores" discloses a composition for treating herpes and cold sores. The composition may be topically applied, ingested into the body, or injected into the body. The composition may be applied quickly and discretely in order to sooth [sic] and treat herpes and cold sores. The composition utilizes an allegedly highly effective combination of compounds, including *Olea europaea* leaf extract and *Olea europaea* fruit oil, to achieve this end.

Another prior art U.S. Pat. No. 11,991,795 assigned to Carrasco Nino, entitled "Herbal compositions and methods for treating herpes" discloses herbal formulations, methods for their preparation, and methods of treating herpes simplex. The formulations can allegedly provide good permeability and bioavailability at the target site.

In addition to the above pathologies, overwhelming evidence from very recent studies reveals that HSV has been associated with other devastating diseases. Non-patent literature assigned to Itzhaki, entitled "Overwhelming Evidence for a Major Role for Herpes Simplex Virus Type 1 (HSV1) in Alzheimer's Disease (AD); Underwhelming Evidence against" discloses the relationship of HSV1 to AD using neural stem cells; the apparent protective effects of treatment of HSV1 infection, or VZV infection with antivirals prior to the onset of dementia; the putative involvement of VZV in AD/dementia; the possible role of human herpesvirus 6 (HHV6) in AD; the seemingly reduced risk of dementia after vaccination with diverse types of vaccine, and the association shown in some vaccine studies with reduced frequency of HSV1 reactivation; anti-HSV serum antibodies supporting the linkage of HSV1 in the brain with AD in APOE-ε4 carriers, and the association between APOE and cognition, and association of APOE and infection with AD/dementia.

Another non-patent literature assigned to Wozniak M A, et. al., entitled "Antivirals Reduce the Formation of Key Alzheimer's Disease Molecules in Cell Cultures Acutely Infected with Herpes Simplex Virus Type 1" discloses the investigation of the virus replication cycle required for Aβ and P-tau accumulation, and whether antiviral agents prevent these changes using recombinant strains of HSV1 that progress only partly through the replication cycle and antiviral agents that inhibit HSV1 DNA replication the scientists have demonstrated treating HSV1-infected cells with antiviral agents decreased the accumulation of β-amyloid and tau protein—which are thought to be key to Alzheimer's disease pathogenesis, and decreased HSV-1 replication.

Another non-patent literature assigned to Tzeng N S, et. al., entitled "Anti-herpetic Medications and Reduced Risk of Dementia in Patients with Herpes Simplex Virus Infections—a Nationwide, Population-Based Cohort Study in Taiwan" discloses a study to investigate the association between herpes simplex virus (HSV) infections and dementia, and the effects of anti-herpetic medications on the risk involved, using Taiwan's National Health Insurance Research Database (NHIRD).

The above studies have shown reactivated HSV infections may increase the risk of dementia by more than 2.5 fold and that "treatment with anti-herpetic medications could reduce nearly 90.8% of the risk of developing dementia in patients with HSV infections. The HSV-infected subjects treated with anti-herpetic medications showed a decreased risk in all types of dementia . . . compared to the group without anti-herpetic medications." Dementia is a significant and growing public health concern; in 2020, an estimated 55 million people worldwide were living with dementia, with the number afflicted expected to nearly double every 20 years.

Another non-patent literature assigned to Abou-Foul, A. K, et. al., entitled "Herpes simplex virus type 2-associated recurrent aseptic (Mollaret's) meningitis in genitourinary medicine clinic: a case report" discloses a close association between Mollaret's meningitis and HSV type 2.

Another non-patent literature entitled "Massive proportion of world's population are living with herpes infection" discloses a virus causing genital herpes that puts millions of people at greater risk of infection with HIV. The above study discloses, 55% of the US population in 2018, was estimated to be infected with HSV type 1, with children and adolescents accounting for one-third of all cases. Globally, the WHO estimated 3.7 billion people had an HSV type 1 infection in 2016. HSV type 2 infects approximately 10-20% of people aged between 18-49 in the US. Globally, the WHO, estimated nearly half a billion people were living with HSV type 2 infections in 2016.

The highest HSV type 2 prevalence is found in the WHO African Region (31.5%), followed by the Region of the Americas (14.4%), with women experiencing disproportionately higher infection rates. To date, there is no cure for herpes; rather it is treated with medications such as Valacyclovir (Valtrex™), Acyclovir (Zovirax™), and Famciclovir (Famvir™). Several common side effects have been documented, including malaise, rash, nausea, vomiting, and transaminitis, with acute kidney injury as one of the most significant side effects reported to date. The emergence of drug-resistant herpes virus strains poses another issue in clinical settings, especially among immunocompromised patients. The development of drug resistance to HSV enhances the need to explore new alternative antiviral agents with multiple targets and mechanisms of action against HSV. In addition, there is also a need to find a safer approach for treating the herpes simplex virus. The present invention provides such a composition and was created after the applicant observed application of *Ocimum basilicum* aided in the recovery of her canker and cold sores, but found the characteristics of a fresh plant presented significant challenges to its effective and optimal use.

In light of the above-mentioned drawbacks, there is a need for a composition or extract that treats and prevents herpes simplex virus (HSV), aphthous, and other mouth ulcers. Also, there is a need for a composition that is rich in anti-viral, anti-oxidant, and anti-inflammatory compounds.

SUMMARY OF THE INVENTION

The present invention generally discloses an anti-viral composition and a method of preparing the same. Further, the present invention discloses an anti-viral composition with anti-viral, anti-oxidant, and anti-inflammatory properties and a method for preparing the anti-viral composition that is useful in reducing herpes simplex virus (HSV) and treating viral infections, aphthous and other mouth ulcers According to the present invention, the composition is an effective herbal composition utilizing standard extraction methods or a green extraction technique to extract and formulate a unique herbal composition with anti-HSV, anti-oxidant, and anti-inflammatory properties. In one aspect of the present invention, the composition is a plant-based extract derived from *Ocimum basilicum* (sweet basil) with abundant polyphenol and triterpene content for inhibiting and treating herpes simplex virus (HSV), aphthous, and other mouth ulcers. Sweet basil comprises an effective amount of bioactive ingredients.

In one aspect of the present invention, the green methods include, but are not limited to, water extraction at ambient temperature (WEAT) and water extraction at elevated temperature and pressure (WEETP). Both these methods involve homogenization, filtration, and enrichment steps to optimize the specific phytochemical content of the resulting therapeutic composition. In one aspect of the present invention, the final composition of the water extract in extraction WEAT and WEETP is in powder form.

In one aspect of the present invention, a method of water extraction at ambient temperature (WEAT) for preparing an anti-viral composition or extract is disclosed. To prepare the composition with optimal bioactive phytochemicals, the first water extract of sweet basil (*Ocimum basilicum*) leaves is prepared at ambient temperature (WEAT). The resulting extract is dried, for example, using a freeze dryer, spray-dryer, vacuum concentrator, dehydrator, oven, or other drying methods. In one aspect of the present invention, the method comprises the following steps. At one step, the herb sweet basil (*Ocimum basilicum*) leaves are harvested without adding the fruits, stem, and roots. Once the leaves are harvested, they are washed and air-dried. If there is limited time for extraction, place the air-dried leaves in a plastic bag and store them in the freezer for up to 2 to 3 days for later extraction. At another step, the leaves are shredded or chopped into fine pieces, and the plant material is ready for the extraction step. At another step, the shredded leaves are added to a solvent and homogenized, lightly ground for 15 minutes. In one embodiment, the solvent may be water. In one embodiment, the shredded leaves are added to about 2 liters of water and homogenized, lightly ground for 15 minutes At another step, the bioactive ingredients are extracted using the solvent to obtain some extract rich in bioactive ingredients. In another aspect of the present invention, the extract is derived from a water extraction at room temperature or ambient temperature or from another solvent or extraction method. At another step, the extract is filtered using a filter paper placed in a funnel. At another step, the extraction is repeated with the residue in the filter paper with additional solvent. In one aspect of the present invention, the additional solvent may be water. In one aspect of the present invention, the residue in the filter paper is mixed with another 2 liters of water for further filtration. At another step, the extracts are combined. At another step, the extract is dried to obtain a powdered extract. In another aspect of the present invention, the extract is dried or dehydrated at a maximum temperature of 50° C. (122° F.). The extract may be dried using a freeze dryer, spray-dryer, vacuum concentrator, dehydrator, oven, or other drying methods. Further, the extract can be stored in an air-tight container in the freezer and lasts for months.

In another aspect of the present invention, the active ingredient of the extract derived at the ambient temperature of the composition contains raffinose, stachyose, glucosyringic acid, tryptophane, folinic acid, 3-ethoxy-4,5-dihydroxybenzoic acid, apocynoside, sinapic acid, rutaevin, vitamin B2, kaempferol-3-o-rutinoside, 3-hydroxy-4-methoxy-cinnamic acid, apocynoside, 4-ethyl-paeoniflorin, tamariscinoside B, 3β-hydrosantamarine-1-o-β-d-glucopyranoside, esculentoside P, esculentagenic acid, arjunglucoside I, or esculentoside B.

In one aspect of the present invention, the extract derived at ambient temperature comprising of an effective amount of sweet basil active ingredient having anti-oxidant activity. In one embodiment, the extract at ambient temperature comprising of an effective amount of sweet basil active ingredient having anti-viral activity. In one aspect of the present invention, the extract derived at ambient temperature comprising of an effective amount of sweet basil active ingredient having anti-inflammatory activity.

Accordingly, the active ingredient of the water extract at ambient temperature comprises at least one or a combination of glucosyringic acid, tryptophane, folinic acid, 3-ethoxy-4,5-dihydroxybenzoic acid, apocynoside, sinapic acid, rutaevin, vitamin B2, kaempferol-3-o-rutinoside, 3-hydroxy-4-methoxy-cinnamic acid, apocynoside, 4-ethyl-paeoniflorin, tamariscinoside B, 3β-hydrosantamarine-1-o-β-d-glucopyranoside, esculentoside P, esculentagenic acid, arjunglucoside I, esculentoside B.

In another aspect of the present invention, a method of water extraction at elevated temperature and pressure (WEETP) for preparing an anti-viral composition is disclosed. In another aspect of the present invention, the composition has optimal bioactive phytochemicals, the second water extraction at elevated temperature (121° C.) and pressure (15 psi) (WEETP) is prepared. At one step, preferably the herb sweet basil (*Ocimum basilicum*) leaves are harvested without adding the fruits, stem, and roots. Once the leaves are harvested, it is washed and is air-dried. If there is limited time for extraction, place the air-dried leaves in a plastic bag and store them in the freezer for up to 2 to 3 days for later extraction. At another step, the leaves are shredded or chopped into pieces, and the plant material is ready for the extraction step. At another step, the shredded leaves are added to 4 liters of water and homogenized, lightly ground for 15 minutes. At another step, place the mixture in a pressure cooker or autoclave. At another step, the bioactive ingredients are extracted using a solvent to obtain some extract rich in bioactive ingredients. The extract is derived from a water extraction at room temperature or ambient temperature or from another solvent or extraction method. At another step, the extract is filtered using a filter paper placed in a funnel. At another step, the extract is dried to obtain a powdered extract. The extract is dried or dehydrated at a maximum temperature of 50° C. (122° F.). The extract is dried using a freeze dryer, spray-dryer, vacuum concentrator, dehydrator, oven, or other drying methods. Further, the extract can be stored in an air-tight container in the freezer and lasts for months.

In another aspect of the present invention, the active ingredient of the water extract of the composition at elevated temperature and pressure contains cichoriin, phenyl propionic acid, glucosyringic acid, tryptophane, 1-O-caffeoyl-β-D-glucopyranoside, apocynoside II, sinapic acid, 3-hydroxy-4-methoxy-cinnamic acid, quercetin-3-O-glucuronide 6''-methylester, methylester, roseoside 1, vitamin B2, kaempferol-3-O-rutinoside, 5,6,4'-trihydroxy-7,8,3'-trimethoxyflavone, 4-ethyl-paeoniflorin, tamariscinoside B, chicoric acid, rosmarinic acid, monocaffeoyltartaric acid (Caftaric acid), kaempferol-3-O-β-D-glucoside-7-O-α-L-arabinofuranoside, hookeroside D, kaempferol-3-O-rutinoside, salvianic acid A, salvianolic acid A, esculentoside P, esculentagenic acid, arjunglucoside, Fraxin, isomaltose, raffinose, and stachyose.

In one aspect of the present invention, the water extract derived at elevated temperature and pressure comprising of an effective amount of sweet basil active ingredient having anti-oxidant activity. In one aspect of the present invention, the water extract at elevated temperature and pressure comprising of an effective amount of sweet basil active ingredient having anti-viral activity. In one aspect of the present invention, the extract derived at elevated temperature and pressure comprising of an effective amount of sweet basil active ingredient having anti-inflammatory activity.

Accordingly, the active ingredient of the water extract at elevated temperature and pressure comprises at least one or a combination of cichoriin, phenyl propionic acid, glucosyringic acid, tryptophane, 1-O-caffeoyl-β-D-glucopyranoside, apocynoside II, sinapic acid, 3-hydroxy-4-methoxy-cinnamic acid, quercetin-3-O-glucuronide 6''-methylester, roseoside 1, vitamin B2, kaempferol-3-O-rutinoside, 5,6,4'-trihydroxy-7,8,3'-trimethoxyflavone, 4-ethyl-paeoniflorin, tamariscinoside B, chicoric acid, rosmarinic acid, monocaffeoyltartaric acid (Caftaric acid), kaempferol-3-O-β-D-glucoside-7-O-α-L-arabinofuranoside, hookeroside D, kaempferol-3-O-rutinoside, salvianic acid A, salvianolic acid A, esculentoside P, esculentagenic acid, and arjunglucoside.

In another aspect of the present invention, the water extract composition at ambient temperature is blended with the water extract at elevated temperature and pressure. The resulting composition is a mixture of bioactive ingredients that exhibit anti-viral, anti-inflammatory, and anti-oxidant properties to treat viral infections such as HSV. These ingredients may be blended to form and administer in the form or method of application or composition of a cream, lotion, liquid, emulsion, spray, serum, balm, gel, lip balm, ointment, powder, pill, tablet, consumable, ingestible, patch, mouthwash, toothpaste, lozenge, mint, candy, chewing gum, or similar, for use in the treatment or prevention of HSV, and aphthous or other ulcers of the mouth.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 5 shows a graph illustrating the percentage cell viability of Vero cells against the water extract of sweet basil (WEAT and WEETP) after 72 hours of incubation in one embodiment of the present invention.

DETAILED DESCRIPTION OF EMBODIMENTS

Figure 1:
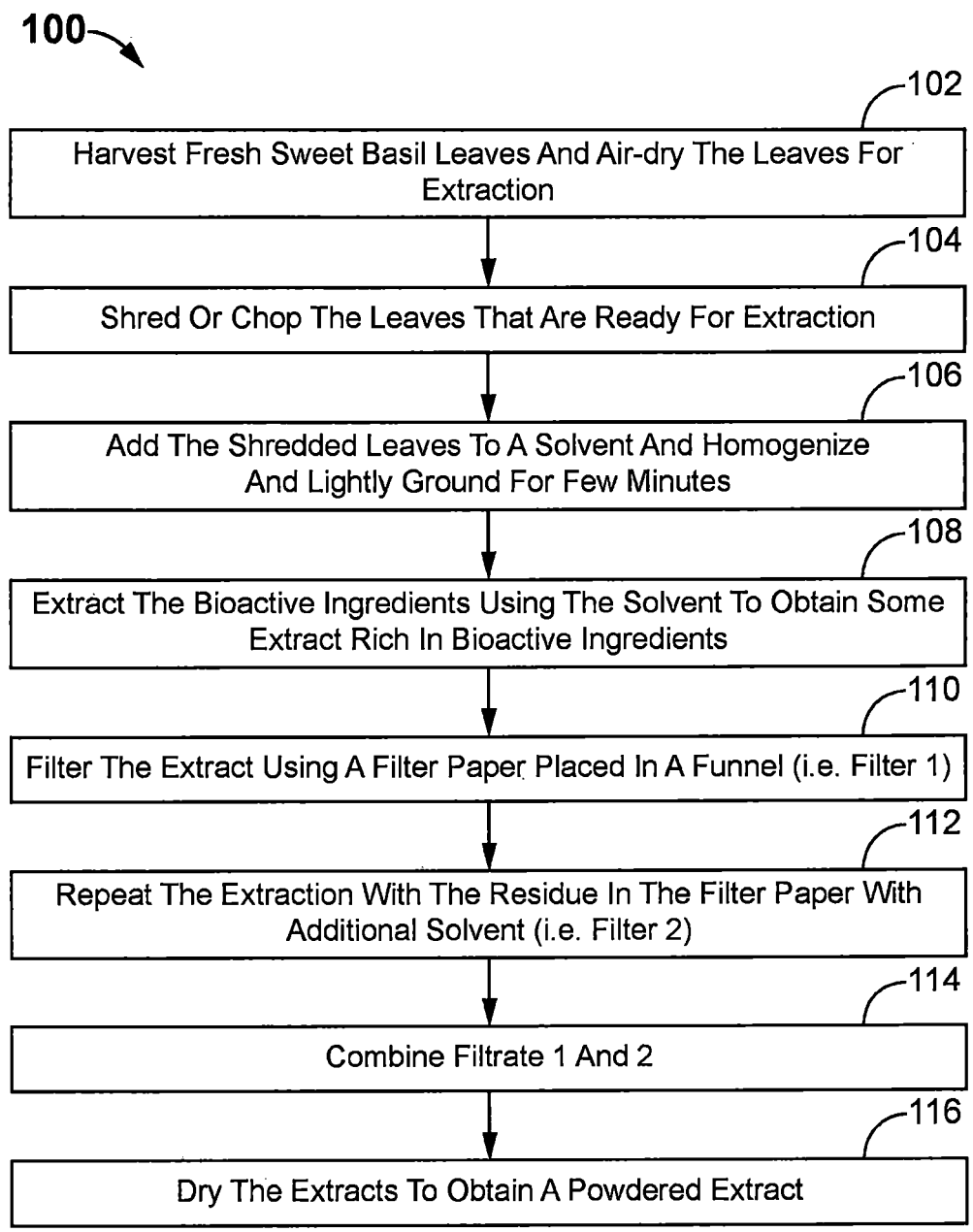
FIG. 1 shows a method for preparing a sweet basil extract at ambient temperature (WEAT) in one embodiment of the present invention.

The present invention is best understood by reference to the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Medicinal plants or herbs have been used for thousands of years to treat a wide array of ailments. Sweet basil (*Ocimum basilicum*) is one such medicinal plant. It is a popular culinary herb used in Chinese and Ayurvedic herbal systems for centuries. Sweet basil is abundant in essential oil as well as polyphenols. In addition, herbal treatments, constituting a wide array of phytochemicals, are thought to act synergistically together at multiple targets to produce a beneficial effect. Further, sweet basil has also been reported to have anti-inflammatory activity, possibly through inhibition of the Tumor necrosis factor receptor superfamily member 9 (Tnfrsf9) expression. The combination of anti-virals and anti-inflammatory preparations has produced a marked reduction in clinical signs of herpes. All of the above distinguishing features confirm sweet basil is an excellent candidate for HSV treatments, more so for drug-resistant HSV strains.

Currently, ethanol is the most commonly used bio-solvent in herb extraction. However, due to safety and environmental concerns, recent extraction techniques have primarily focused on finding solutions that minimize the use of harmful solvents while ensuring cost-effectiveness and the production of high-quality extracts through green extraction techniques. One of the best solvents to use is water. At room temperature and pressure, water has a dielectric constant of ca. 80, making it a polar solvent. However, this value can be considerably lowered under a pressurized hot water extraction technique; for example, water at 250° C. and 4 Mpa can mimic the extraction capacity of ethanol and is suitable for the extraction of low-polarity compounds.

Below are a few examples illustrating the use of sweet basil leaves in the treatment of canker sores and cold sores.

In one example, a female who had suffered from canker sores since she was in elementary school suffered from increased frequency and duration of canker sores in her thirties. At one point within the last six months of a single year, she experienced four canker sores. She observed her sores usually took approximately two weeks from the time she first noticed the tingling or discomfort indicative of a sore to completion of healing. Because of the length of time until healed, this meant she suffered from an aphthous ulcer for two months out of the six-month time period—approximately 33% of the time. These ulcers were larger and closer to her lip than she had experienced previously, limiting her eating, and in the worst cases, preventing her ability to form a smile or speak normally. Later, she began applying masticated sweet basil leaves when she felt a canker sore coming on because sweet basil was one of only two plants she had in her residence. When applied early, the masticated basil, or bolus thereof, often prevented the actualization of the ulcer. When applied after the ulcer had materialized, the basil ameliorated the pain and accelerated healing time significantly. Because she is prone to aphthous ulcers, when she accidentally bit her cheek or tongue, it almost invariably would become a canker sore. She began applying the masticated basil leaves proactively to the sites she had bitten and observed this prevented the formation of the canker sores at the trauma site. She has used the plant material effectively to accelerate healing or prevent the actualization of canker sores in at least two dozen instances.

In another example, a female in her thirties applied masticated basil leaves to the burning spot on her lip—the burning she usually felt proceeding a cold sore (also known as a fever blister). She applied it again before bed, leaving the plant matter pressed onto and over her lip overnight to attempt to hold it in place. The cold sore did not actualize. Though the plant matter dried and hardened uncomfortably and painfully to the lip and stained the lip and skin around the mouth green, evidencing the need for a more practical application method. The next time the same female felt another fever blister coming on, she applied the plant matter in the morning, again after eating meals, and before bed, leaving it on overnight as best she could. When she woke the next morning, the blister had already scabbed; within another 24 hours the scab had fallen off leaving a slightly lighter pink impression than her natural lip color. Out of three different times this female has felt an imminent fever blister and applied the plant matter, once the fever blister did not materialize; once the blister materialized but the burning was attenuated significantly and the blister healed within 2.5 days; and once the blister scabbed rapidly with the scab falling off the next day. The female reports not experiencing her first fever blister until the age of 28 or 29, and usually experiences them during high-stress periods, but has not had a recent recurrence despite describing the time as one of the most stressful of her entire life. Additionally worth noting, this female suffered from both chickenpox and shingles (HSV-3) as a child.

In both of the above examples, the individual was limited in universally treating the imminent cold sores or canker sores she felt coming on due to several factors including being unable to have the fresh plant on hand at all times—live basil plants in the United States are commonly infected with stem rot fungus (*Fusarium oxysporum* f. sp. *basilicum*) which causes the plants to die quickly and pre-cut basil leaves bought from a market have an even shorter life, often of only a 2-4 days; difficulty keeping the plant matter on the impending cold sore or canker sore site; and the physical visibility of, discomfort, and green stain resulting from, plant matter application. The use of a form or method of application including for example, but not limited to, a liquid, emulsion, spray, serum, gel, balm, lip balm, cream, lotion, ointment, pill, consumable, ingestible, patch, powder, mouthwash, toothpaste, lozenge, chewing gum, or similar other treatment containing active components of basil eliminates many of those limitations. Additionally, the WEETP extraction method described herein significantly amplifies the anti-viral components and efficacy of the plant against HSV. While the WEAT extraction method maintains a profile thought to most similarly replicate the use of the raw plant matter but allows for stabilization.

In one embodiment, the present invention relates to anti-viral compositions. In one embodiment, the present invention further relates to a process for preparing the anti-viral composition that is useful in reducing herpes simplex virus (HSV) and treating viral infections, aphthous, and other mouth ulcers. In one embodiment, the composition is based upon constituents isolated from or contained within that of sweet basil. In one embodiment, further, a method of producing plant-based formulation with anti-HSV activity is described.

In one embodiment, the method of the present invention is an effective herbal composition utilizing standard extraction methods or a green extraction technique to extract and formulate a unique herbal composition with anti-HSV, anti-oxidant and anti-inflammatory properties. The green method includes water extraction at ambient temperature (WEAT) and water extraction at elevated temperature and pressure (WEETP). Both these methods involve homogenization, filtration, and enrichment steps to optimize the specific phytochemical content of the resulting therapeutic composition. Additionally, the WEETP extraction method described significantly amplifies the anti-viral components and efficacy of the plant against HSV. While the WEAT extraction method maintains a profile thought to most similarly replicate the use of the raw plant matter but allows for stabilization.

In one embodiment, the method includes pharmacologic compositions derived from the herb *Ocimum basilicum* with abundant polyphenol and triterpene content. The compositions may be used topically, orally, or parenterally and exhibit strong anti-viral and anti-oxidant activities. In one embodiment, the compositions also contain anti-inflammatory ingredients. They are highly useful in treating viral infections such as HSV.

Referring to FIG. 1, a method 100 for preparing a composition or plant-based water extract in one embodiment of the present invention. At step 102, preferably the herb sweet basil (*Ocimum basilicum*) leaves are harvested without adding the fruits, stem, and roots. Once the leaves are harvested, they are washed and air-dried. If there is limited time for extraction, place the air-dried leaves in a plastic bag and store them in the freezer for up to 2 to 3 days for later extraction. At step 104, the leaves are shredded or chopped into pieces, and the plant material is ready for the extraction step. At step 106, the shredded leaves are added to a solvent and homogenized, then lightly ground for 15 minutes. In one embodiment, the solvent may be water. In one embodiment, the shredded leaves are added to the 2 liters of water and homogenized, then lightly ground for 15 minutes. At step 108, the bioactive ingredients are extracted using a solvent to obtain some extract rich in bioactive ingredients. The extract may be derived from a water extraction at room temperature or ambient temperature. At step 110, the extract is filtered using a filter paper placed in a funnel. At step 112, the extraction is repeated with the residue in the filter paper with additional solvent. In one embodiment, the solvent may be water. In one embodiment, the residue in the filter paper is filtered again using another 2 liters of water. At step 114, the extracts of steps 110 and 112 are combined together. At step 116, the extract is dried to obtain a powdered extract. In one embodiment, further the extract is dried or dehydrated at a maximum temperature of 50° C. (122° F.). In one embodiment, the extract is dried using a freeze dryer, spray-dryer, vacuum concentrator, dehydrator, oven, or other drying methods. Further, the extract can be stored in an air-tight container in the freezer and lasts for months.

In one aspect of the present invention, the method 100 uses a plurality of active ingredients including, but not limited to, syringic acid, tryptophane, vitamin B9, benzoic acid, apocynoside, cinnamic acid, rutaevin, vitamin B2, kaempferol, paeoniflorin, tamariscinoside, hydrosantamarine, esculentoside, esculentagenic acid, arjunglucoside, and esculentoside.

In another aspect of the present invention, the method 100 uses a plurality of active ingredients. The active ingredients of the water extract at an ambient temperature of the composition contain raffinose, stachyose, glucosyringic acid, tryptophane, folinic acid, 3-ethoxy-4,5-dihydroxybenzoic acid, apocynoside, sinapic acid, rutaevin, vitamin B2, kaempferol-3-o-rutinoside, 3-hydroxy-4-methoxy-cinnamic acid, apocynoside, 4-ethyl-paeoniflorin, tamariscinoside B, 3β-hydrosantamarine-1-o-β-d-glucopyranoside, esculentoside P, esculentagenic acid, arjunglucoside I, esculentoside B.

In one embodiment, the extract derived at ambient temperature comprising of an effective amount of sweet basil active ingredient having anti-oxidant activity. In one embodiment, the water extract at ambient temperature comprising of an effective amount of sweet basil active ingredient having anti-viral activity. In one embodiment, the extract derived at ambient temperature comprising of an effective amount of sweet basil active ingredient having anti-inflammatory activity.

Accordingly, the active ingredient of the water extract at ambient temperature comprises at least one or a combination of glucosyringic acid, tryptophane, folinic acid, 3-ethoxy-4,5-dihydroxybenzoic acid, apocynoside, sinapic acid, rutaevin, vitamin B2, kaempferol-3-o-rutinoside, 3-hydroxy-4-methoxy-cinnamic acid, apocynoside, 4-ethyl-paeoniflorin, tamariscinoside B, 3β-hydrosantamarine-1-o-β-d-glucopyranoside, esculentoside P, esculentagenic acid, arjunglucoside I, esculentoside B.

Several factors are critical for the final extract, including part of the herb used, complete drying of extract at low temperature, though drying to a lesser extent may be appropriate for extracts for use in some compositions (for example, but not limited to, a cream or lotion), and storage conditions. Adherence to these factors will result in the optimal pharmacologic composition.

Figure 2:
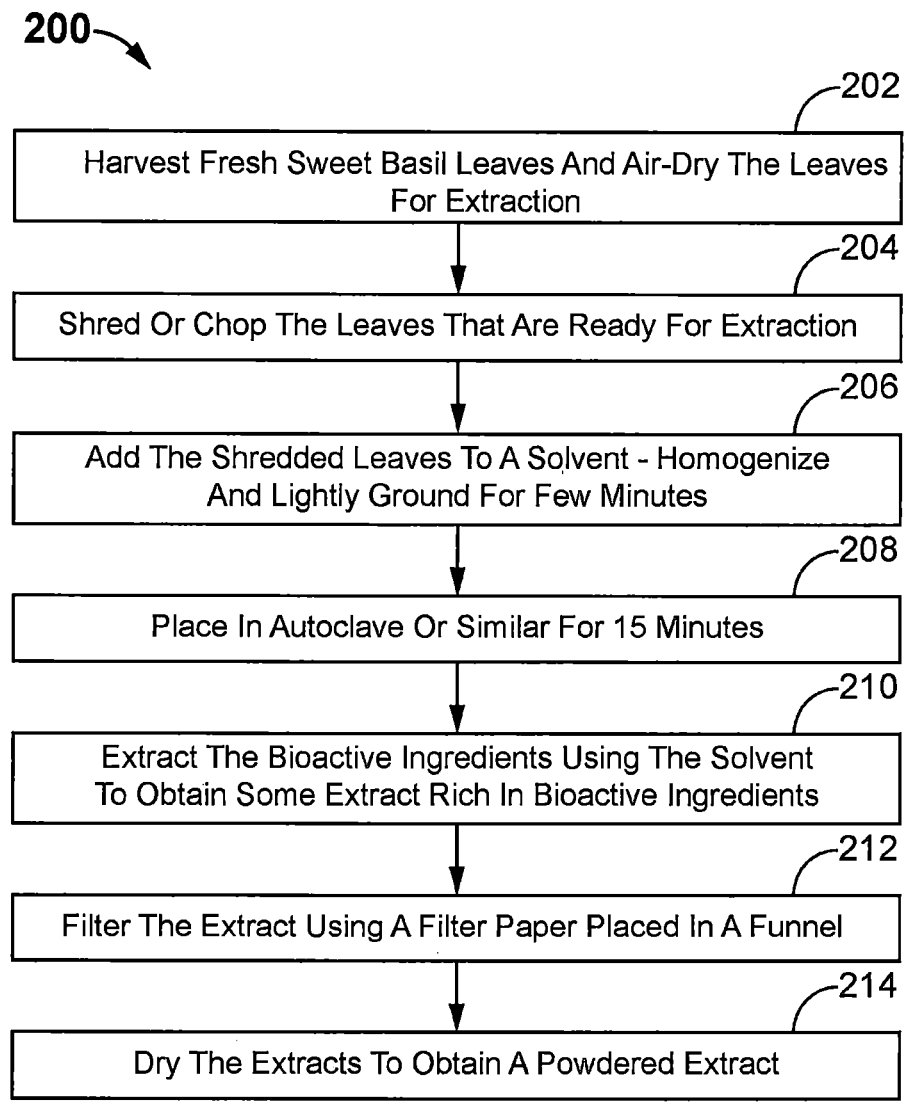
FIG. 2 shows a method for preparing a sweet basil extract at elevated temperature and pressure (WEETP) in one embodiment of the present invention.

Referring to FIG. 2, a method 200 for preparing a composition or plant-based water extract at elevated temperature and pressure in one embodiment of the present invention. At step 202, preferably the herb sweet basil (*Ocimum basilicum*) leaves are harvested without adding the fruits, stem, and roots. Once the leaves are harvested, they are washed and air-dried. If there is limited time for extraction, place the air-dried leaves in a plastic bag and store them in the freezer for up to 2 to 3 days for later extraction. At step 204, the leaves are shredded or chopped into fine pieces, and the plant material is ready for the extraction step. At step 206, the shredded leaves are added to a solvent and homogenized, lightly ground for 15 minutes. In one embodiment, the solvent may be water. In one embodiment, the shredded leaves are added to the 4 liters of water and homogenized, lightly ground for 15 minutes. At step 208, place the mixture in a pressure cooker or autoclave. At step 210, the bioactive ingredients are extracted using a solvent to obtain some extract rich in bioactive ingredients. At step 212, the extract is filtered using a filter paper placed in a funnel. At step 214, the extract is dried to obtain a powdered extract. In one embodiment, further, the extract is dried or dehydrated at a maximum temperature of 50° C. (122° C.). In one embodiment, the extract is dried using a freeze dryer, spray-dryer, vacuum concentrator, dehydrator, oven, or other drying methods. Further, the extract may be stored in an air-tight container in the freezer and lasts for months.

In one aspect of the present invention, the method 200 uses a plurality of active ingredients including, but not limited to, cichoriin, propionic acid, syringic acid, tryptophane, caffeoyl-glucose, apocynoside, cinnamic acid, quercetin, roseoside, vitamin B2, flavone, kaempferol, paeoniflorin, tamariscinoside, caftaric acid, hookeroside, rosmarinic acid, salvianic acid, salvianolic acid, esculentoside, esculentagenic acid, and arjunglucoside.

In another aspect of the present invention, the method 200 uses a plurality of active ingredients. The active ingredient of the water extract of the composition at elevated temperature and pressure contains cichoriin, phenyl propionic acid, glucosyringic acid, tryptophane, 1-O-caffeoyl-β-D-glucopyranoside, apocynoside II, sinapic acid, 3-hydroxy-4-methoxy-cinnamic acid, quercetin-3-O-glucuronide 6"-methylester, roseoside 1, vitamin B2, kaempferol-3-O-rutinoside, 5,6,4'-trihydroxy-7,8,3'-trimethoxyflavone, 4-ethyl-paeoniflorin, tamariscinoside B, chicoric acid, rosmarinic acid, monocaffeoyltartaric acid (Caftaric acid), kaempferol-3-O-β-D-glucoside-7-O-α-L-arabinofuranoside, hookeroside D, kaempferol-3-O-rutinoside, salvianic acid A, salvianolic acid A, esculentoside P, esculentagenic acid, arjunglucoside, Fraxin, isomaltose, raffinose, and stachyose.

In one embodiment, the water extract derived at elevated temperature and pressure comprising of an effective amount of sweet basil active ingredient having anti-oxidant activity. In one embodiment, the water extract at elevated temperature and pressure comprising of an effective amount of sweet basil active ingredient having anti-viral activity. In one embodiment, the water extract derived at elevated temperature and pressure comprising of an effective amount of sweet basil active ingredient having anti-inflammatory activity.

Accordingly, the active ingredient of the water extract at elevated temperature and pressure comprises at least one or a combination of cichoriin, phenyl propionic acid, glucosyringic acid, tryptophane, 1-O-caffeoyl-β-D-glucopyranoside, apocynoside II, sinapic acid, 3-hydroxy-4-methoxy-cinnamic acid, quercetin-3-O-glucuronide 6"-methylester, roseoside 1, vitamin B2, kaempferol-3-O-rutinoside, 5,6,4'-trihydroxy-7,8,3'-trimethoxyflavone, 4-ethyl-paeoniflorin, tamariscinoside B, chicoric acid, rosmarinic acid, monocaffeoyltartaric acid (Caftaric acid), kaempferol-3-O-β-D-glucoside-7-O-α-L-arabinofuranoside, hookeroside D, kaempferol-3-O-rutinoside, salvianic acid A, salvianolic acid A, esculentoside P, esculentagenic acid, and arjunglucoside.

In another aspect of the present invention, the water extract composition at ambient temperature is blended with the water extract at elevated temperature and pressure. The resulting composition is a mixture of bioactive ingredients that exhibit anti-viral, anti-inflammatory, and anti-oxidant properties to treat viral infections such as HSV. These ingredients may be blended to form and administer in the form or method of application or composition of a cream, lotion, liquid, emulsion, spray, serum, balm, gel, lip balm, ointment, powder, pill, tablet, consumable, ingestible, patch, mouthwash, toothpaste, lozenge, mint, candy, chewing gum, or similar, for use in the treatment or prevention of HSV, and aphthous or other ulcers of the mouth.

Figure 3:
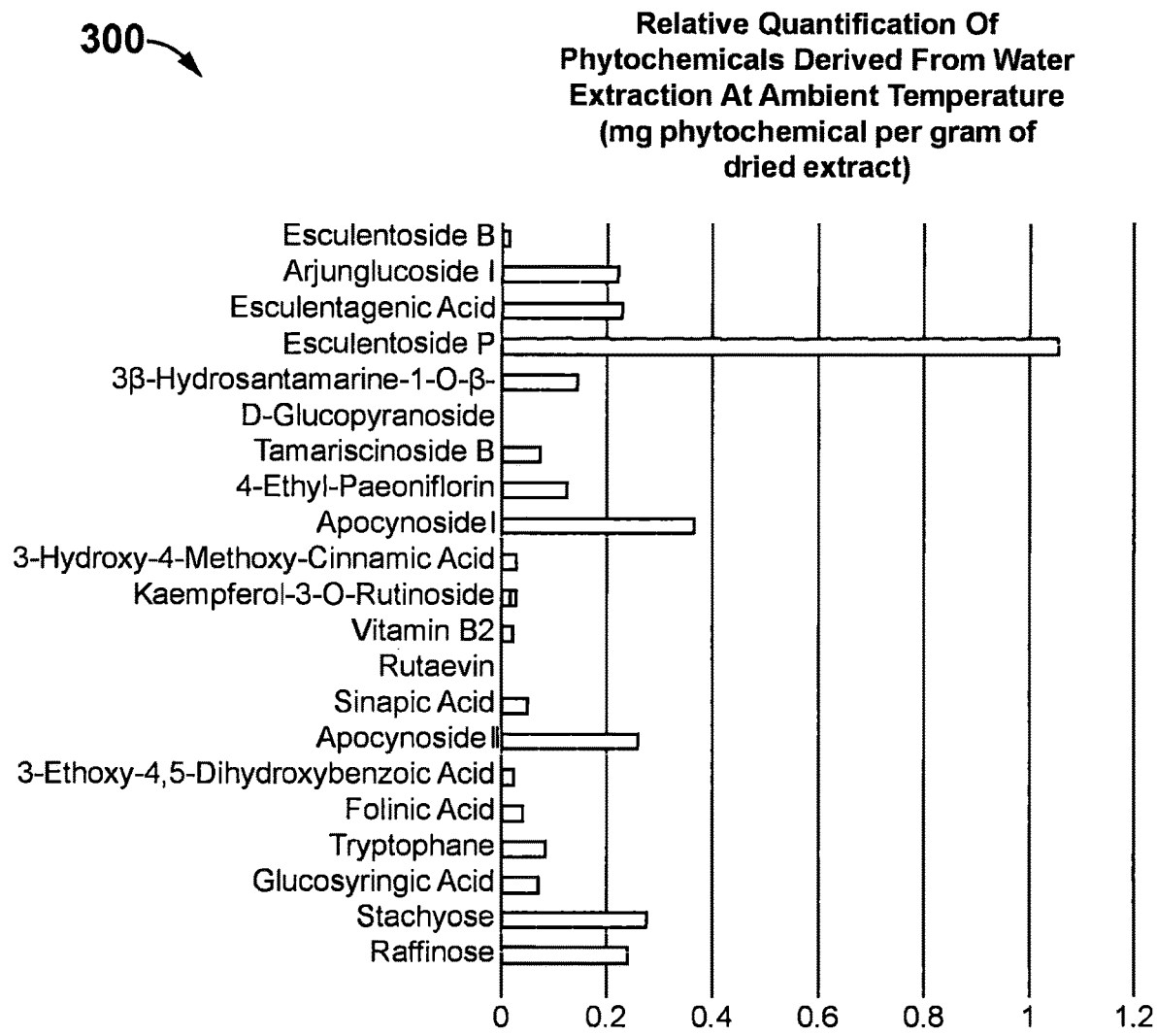
FIG. 3 shows a bar chart illustrating the relative quantification of phytochemicals present in the water extraction at ambient temperature in one embodiment of the present invention.

Referring to FIG. 3, a bar chart 300 illustrating the relative quantification (mg/g) of phytochemicals present in the water extraction at ambient temperature in one embodiment of the present invention. The bar chart 300 shows the composition and the relative molar abundance of the bioactive ingredients. The active ingredient in the water extract of the composition at ambient temperature comprises at least one or a combination of glucosyringic acid, tryptophane, folinic acid, 3-ethoxy-4,5-dihydroxybenzoic acid, apocynoside, sinapic acid, rutaevin, vitamin B2, kaempferol-3-o-rutinoside, 3-hydroxy-4-methoxy-cinnamic acid, apocynoside, 4-ethyl-paeoniflorin, tamariscinoside B, 3β-hydrosantamarine-1-o-β-d-glucopyranoside, esculentoside P, esculentagenic acid, arjunglucoside I, esculentoside B, stachyose and raffinose.

Figure 4:
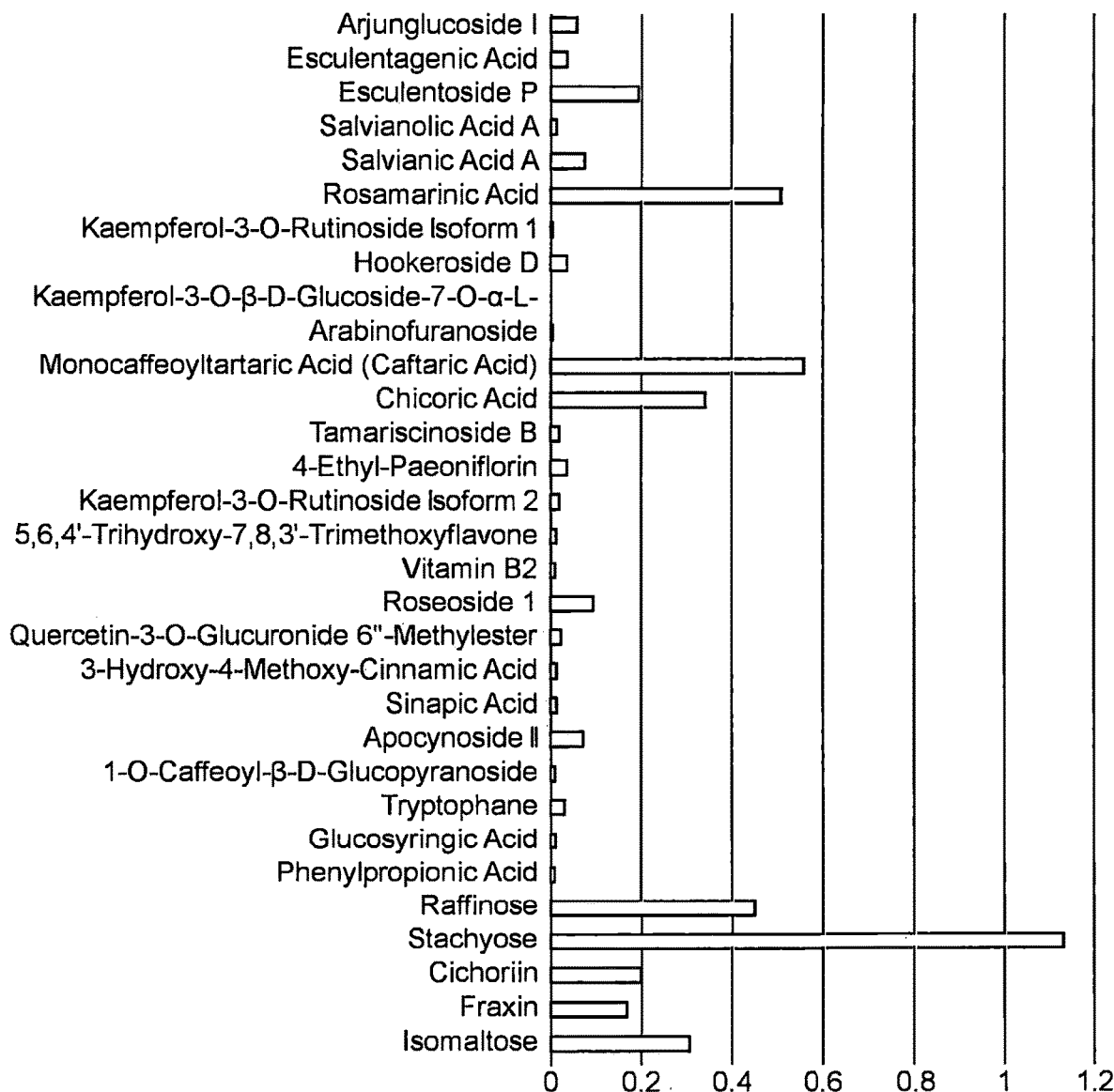
FIG. 4 shows a bar chart illustrating the relative quantification of phytochemicals present in the water extraction at elevated temperature and pressure (121° C., 15 psi) in one embodiment of the present invention.

Referring to FIG. 4, a bar chart 400 illustrating the relative quantification (mg/g) of phytochemicals present in the water extraction at elevated temperature and pressure in one embodiment of the present invention. The bar chart 400 shows the composition and the relative molar abundance of the bioactive ingredients. The active ingredient in the water extract of the composition at elevated temperature and pressure comprises at least one or a combination of cichoriin, phenyl propionic acid, glucosyringic acid, tryptophane, 1-O-caffeoyl-β-D-glucopyranoside, apocynoside II, sinapic acid, 3-hydroxy-4-methoxy-cinnamic acid, quercetin-3-O-glucuronide 6"-methylester, roseoside 1, vitamin B2, kaempferol-3-o-rutinoside, 5,6,4'-trihydroxy-7,8,3'-trimethoxyflavone, 4-ethyl-paeoniflorin, tamariscinoside B, chicoric acid, βrosmarinic acid, monocaffeoyltartaric acid (Caftaric acid), kaempferol-3-O-β-D-glucoside-7-O-α-L-arabinofuranoside, hookeroside D, kaempferol-3-O-rutinoside, salvianic acid A, salvianolic acid A, esculentoside P, esculentagenic acid, arjunglucoside, Fraxin, isomaltose, raffinose, and stachyose.

Figure 6:
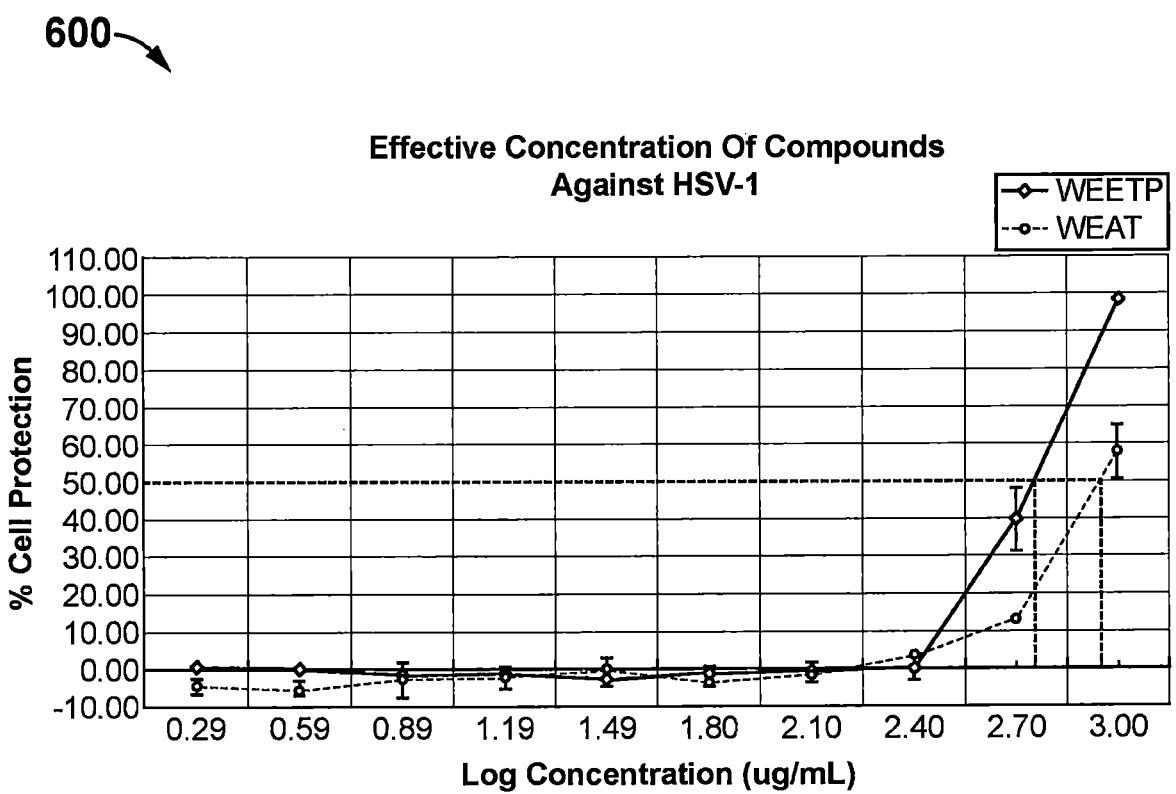
FIG. 6 shows a graph illustrating the percentage cell viability of HSV infected Vero cells (or percentage protection) against the water extract of sweet basil (WEAT and WEETP) after 72 hours of incubation in one embodiment of the present invention.

Referring to FIGS. 5-6, the graphs illustrate the percentage cell viability of Vero cells against the water extract of sweet basil and the percentage cell viability of HSV infected Vero cells against the water extract of sweet basil after incubation in one embodiment. In one embodiment, the graph 500 shows the number of Vero cells against water extract of sweet basil in (Water extraction at ambient temperature) WEAT and the graph 600 shows the number of HSV infected Vero cells against water extract of sweet basil in (Water extraction at elevated temperature and pressure) WEETP up to a concentration of 1000 μg/ml for 72 hours. The water extract of sweet basil of the present invention showed low toxicity to Vero cells where at 250 µg/ml, the cell viability is still around 90%. The cytotoxic concentration of the compounds against Vero cell i.e., CC50 value is >1000 µg/mL while the effective concentration of compounds against HSV-1 i.e., EC50 is 735.70 µg/mL for WEETP and 812.8 µg/mL for WEAT, indicating that WEETP is more potent than WEAT in inhibiting HSV. In one embodiment, the dark line indicates the WEEPT concentration and the light line indicates the WEAT concentration.

The present invention will be explained in more detail through the examples below. The examples are presented only to illustrate the preferred embodiments of the present invention and are not intended in any way to limit the scope of the present invention.

EXAMPLE 1

Water Extraction at Ambient Temperature (WEAT)

In one embodiment, the shredded plant material is mixed with water to prepare for the first extraction at ambient temperature. A ratio of 200 ml of deionized water is added to 20 g of plant material. The mixture is then homogenized for 10 minutes and placed on a shaker for another 10 minutes. The mixture is then filtered using a Whitman No 1 filter paper. The whole process is repeated by adding another 200 ml of deionized water to the filtered residue. Both the filtrate and extract are then mixed. The extract is dried using either a freeze dryer, spray-dryer, vacuum concentrator, dehydrator, oven, or other drying methods until completely dried. 5 mg/ml of extract was then filtered using a nylon syringe filter (0.2 µm, 13 mm) before analysis by Ultra high-performance liquid chromatography (UHPLC) coupled to a Vion IMS QTOF hybrid mass spectrometer, equipped with a Lock Spray ion source used to identify the compounds.

In one embodiment, the water extract at an ambient temperature (AT) contains glucosyringic acid, tryptophane, folinic acid, 3-ethoxy-4,5-dihydroxybenzoic acid, apocynoside I, sinapic acid, rutaevin, vitamin B2, kaempferol-3-o-rutinoside, 3-hydroxy-4-methoxy-cinnamic acid, apocynoside II, 4-ethyl-paeoniflorin, tamariscinoside B, 3β-hydrosantamarine-1-o-β-d-glucopyranoside, esculentoside P, esculentagenic acid, arjunglucoside I, esculentoside B, stachyose, and raffinose.

In one embodiment, the Triterpenes such as Esculentoside P, Arjunglucoside I, Esculentagenic acid, and Esculentoside B are found abundantly in WEAT (as shown in FIG. 3). These triterpenes encompass about 45% of the bioactive ingredients in the extract. This is the first time these triterpenes are reported in the water extract of sweet basil. Several studies have indicated that Esculentoside P and Arjunglucoside I are potent anti-inflammatory ingredients. It exhibits its anti-inflammatory response by inactivating nuclear factor Kappa-B signaling pathway and phospho-c-Jun N-terminal kinase and by inhibiting nitric oxide production.

EXAMPLE 2

Water Extraction at Elevated Temperature and Pressure (WEETP)

In one embodiment, the shredded plant material is mixed with water to prepare for the second extraction. A ratio of 400 ml of deionized water is added to 20 g of plant material. The mixture is then homogenized for 10 minutes and then subjected to extraction at elevated temperature and pressure (121° C., 15 psi) using an autoclave for 15 mins. The cooled mixture is then filtered using a Whitman No 1 filter paper. The extract is dried either using a freeze dryer, spray-dryer, vacuum concentrator, dehydrator, oven, or other drying methods until completely dried. 5 mg/ml of extract was then filtered using a nylon syringe filter (0.2 µm, 13 mm) before analysis by UHPLC coupled to a Vion IMS QTOF hybrid mass spectrometer, equipped with a Lock Spray ion source used to identify the compounds.

The water extract at an elevated temperature and pressure (WEETP) contains cichoriin, phenyl propionic acid, glucosyringic acid, tryptophane, 1-O-Caffeoyl-β-D-glucopyranoside, apocynoside II, sinapic acid, 3-hydroxy-4-methoxy-cinnamic acid, quercetin-3-O-glucuronide 6"-methylester, roseoside 1, vitamin B2, kaempferol-3-O-rutinoside, 5,6,4'-trihydroxy-7,8,3'-trimethoxyflavone, 4-ethyl-paeoniflorin, tamariscinoside B, chicoric acid, rosmarinic acid, monocaffeoyltartaric acid (Caftaric acid), kaempferol-3-O-β-D-glucoside-7-O-α-L-arabinofuranoside, hookeroside D, kaempferol-3-O-rutinoside, salvianic acid A, salvianolic acid A, esculentoside P, esculentagenic acid, arjunglucoside, Fraxin, isomaltose, raffinose, and stachyose. The most abundant bioactive ingredients in WEETP are polyphenols totaling about 32% of the bioactive ingredients in the extract.

EXAMPLE 3

Total Phenol Content of Sweet Basil Water Extract

In one embodiment, the total phenolic content assay (TPC) was carried out by adding 20 µL water extract at 5 mg/ml to 100 µL Folin-Ciocalteu (1/10 diluted) followed by 80 µL sodium carbonate (7.5% m/v). The mixture was left in the dark for 15 min before absorbance was taken at 750 nm. Total phenolic content was calculated relative to the standard curve created using gallic acid and expressed as gallic acid equivalent (GAE) per 1 mg dried extract. The phenolic content of the two different approaches of water extract is described in Table 1.

The phenolic content of WEETP is ten folds higher compared to WEAT. This may be due to the lower dielectric constant of water at 121° C. and 15 psi, making it a better solvent to extract lower polarity phenolic compounds (as shown in FIG. 4).

EXAMPLE 4

Antioxidant Activity of Sweet Basil Water Extract

In one embodiment, 2,2-Diphenyl-1-picrylhydrazyl (DPPH) free radical scavenging assay was carried out on both the water extracts. The water extracts were serially diluted from 2 mg/ml to 0.125 mg/ml. 50 µl of the extracts were added with 100 µl of DPPH (15 mM) and left in the dark for 15 minutes. A blank sample was prepared by adding extract with methanol, replacing DPPH. Negative control was prepared by replacing the extract with water. Absorbance at 550 nm was taken for all extracts. The $IC_{50}$ value was calculated based on the formula given below.

$$IC_{50} = \frac{(\text{Abs negative control}) - (\text{Abs blank sample} - \text{Abs sample})}{(\text{Abs negative control})} \times 100$$

The $IC_{50}$ value is much lower in the sweet basil WEETP, indicating a higher antioxidant capacity compared to WEAT. This may be due to the higher amounts of phenolic compounds in WEETP, as displayed in the below Table 1.

TABLE 1

Total Phenol content (TPC) and DPPH scavenging
assay of sweet basil WEAT and WEETP

| Type of extract | TPC (µg GAE/1 mg dried extract) | DPPH (IC$_{50}$, µg/ml) |
|---|---|---|
| WEAT | 4.14 ± 1.66 | 700.33 ± 76.79 |
| WEETP | 43.22 ± 2.21 | 112.33 ± 7.64 |

EXAMPLE 5

Toxicity Levels of Sweet Basil Water Extract in Vitro

The maximal non-toxic dose (MNTD) is a concentration that does not show any toxicity effects on cell viability. For in vitro toxicity testing, WEAT and WEETP were tested on Vero cells (African Green Monkey Kidney cells) up to a concentration of 1000 µm/ml for 72 hours.

The cytotoxicity effect of the compounds on Vero cells was determined by using the CellTiter 96→ Water Non-Radioactive Cell Proliferation Assay kit (Promega, USA) according to the manufacturer's instructions. This assay is developed based on the conversion of yellow-colored tetrazolium salt to the purple soluble formazan crystals by the dehydrogenase enzyme found in viable cells only. Vero cells were seeded onto 96-well culture plates at a cell density of 2×104 cells per well and allowed for overnight incubation for cell attachment. Serial dilution of the compound was prepared and added into each well to reach a final concentration of 1.95, 3.91, 7.81, 15.63, 31.25, 62.50, 125, 250, 500, 1000 µg/mL, respectively. The plate was incubated at 37° C., 5% CO2 for 72 hours. The MTS [3-(4,5-dimethylthiazol-2-yl)-5-(3-carboxymethoxyphenyl)-2-(4-sulfophenyl)-2H-tetrazolium] solution was prepared and was added to each well and incubated for one hour in the dark at 37° C. The absorbance was measured at 490 nm. The maximum non-toxic dose (MNTD) and half-maximal cytotoxic concentration (CC$_{50}$) were determined from the percentage of cell viability versus concentration plot as shown in FIG. 5). The CC$_{50}$ of the test compound was defined as the concentration that reduced the absorbance of mock-infected cells to 50% of that of controls.

Percentage cell viability=[(OD$_T$)$_{MOCK}$/(OD$_C$)$_{MOCK}$]× 100(%)

Where,
(OD$_T$)$_{MOCK}$: absorbance of the test sample
(OD$_C$)$_{MOCK}$: absorbance of cell control

TABLE 2

Percentage cell viability of Vero cells against
WEETP and WEAT after 72 hours of incubation

| Compound concentration (µg/mL) | Log compound concentration (µg/mL) | Water extract at elevated temperature & pressure (WEETP) | Water extract at ambient temperature (WEAT) |
|---|---|---|---|
| | | Average cell viability (%) | |
| 1.95 | 0.29 | 98.07 ± 0.54 | 101.00 ± 1.97 |
| 3.91 | 0.59 | 98.69 ± 0.84 | 98.30 ± 4.97 |
| 7.81 | 0.89 | 100.05 ± 4.98 | 100.15 ± 4.72 |
| 15.63 | 1.19 | 99.08 ± 2.25 | 99.80 ± 4.85 |
| 31.25 | 1.49 | 99.45 ± 0.74 | 100.67 ± 5.31 |
| 62.50 | 1.80 | 97.46 ± 2.32 | 100.75 ± 3.33 |
| 125 | 2.10 | 94.95 ± 1.49 | 96.05 ± 6.12 |
| 250 | 2.40 | 89.41 ± 3.33 | 89.36 ± 4.06 |
| 500 | 2.70 | 76.01 ± 4.36 | 81.71 ± 5.06 |
| 1000 | 3.00 | 61.20 ± 0.83 | 81.47 ± 1.65 |

In one embodiment, the above table shows a percentage cell viability of Vero cells against WEETP and WEAT after 72 hours of incubation. In one embodiment, each value is the mean±S.D. of three independent experiments. In one embodiment, further referring to above Table 2 and FIG. 5, both WEETP and WEAT have a CC$_{50}$ value of higher than 1000 µg/mL, indicating low toxicities in both these water extracts.

EXAMPLE 6

Anti-Viral Activity Against Herpes Simplex Virus Type-1 (HSV-1) In Vitro

Vero cells were seeded onto 96-well culture plates at a cell density of 2×104 cells per well and allowed for overnight incubation for cell attachment. Serial dilution of the water extract was prepared and added into each well to reach a final concentration of 1.95, 3.91, 7.81, 15.63, 31.25, 62.50, 125, 250, 500, 1000 µg/mL respectively. Vero cells were infected with HSV-1 at MOI (multiplicity of infection) of 2 except for the cell control. The plates were then incubated at 37° C., 5% CO$_2$ for 72 hours. The MTS solution was prepared and was added to each well and incubated for one hour in the dark at 37° C. The absorbance was measured at 490 nm. The 50% anti-viral effective concentration (EC$_{50}$) was expressed as the concentration that achieved 50% protection of virus-infected cells from the HSV-induced destruction. The percentage protection was calculated as follows:

Percentage protection=[(OD$_T$)$_{HSV}$−(OC$_C$)$_{HSV}$]/[OD$_C$$_{MOCK}$−(OD$_C$)$_{HSV}$]×100(%)

Where,
(OD$_T$)$_{HSV}$: absorbance of the test sample
(OD$_C$)$_{HSV}$: absorbance of the virus-infected control (no compound)
(OD$_C$)$_{MOCK}$: absorbance of the mock-infected control The selective index (SI) indicates the compound's safety in vitro. It is a ratio that measures the window between cytotoxicity and the anti-viral activity of the tested compound. SI was calculated as follows:

Selective index, SI=CC$_{50}$/EC$_{50}$

TABLE 3

The percentage cell viability of HSV infected Vero cells
(or percentage protection) against the water extract of
sweet basil (WEETP and WEAT) after 72 hours of incubation.

| | | Effective concentration (%) | |
|---|---|---|---|
| Compound concentration (μg/mL) | Log compound concentration (μg/mL) | Water extract at elevated temperature & pressure (WEETP) | Water extract at ambient temperature (WEAT) |
| 1.95 | 0.29 | 0.58 ± 0.81 | −4.40 ± 4.53 |
| 3.91 | 0.59 | 0.01 ± 1.53 | −5.72 ± 5.34 |
| 7.81 | 0.89 | −0.96 ± 2.74 | −2.82 ± 9.58 |
| 15.63 | 1.19 | −1.17 ± 1.82 | −2.49 ± 5.37 |
| 31.25 | 1.49 | −2.82 ± 2.23 | −0.75 ± 7.59 |
| 62.50 | 1.80 | −1.36 ± 3.27 | −4.01 ± 1.26 |
| 125 | 2.10 | −0.80 ± 5.00 | −1.77 ± 1.30 |
| 250 | 2.40 | −0.17 ± 6.06 | 3.24 ± 1.25 |
| 500 | 2.70 | 39.45 ± 17.05 | 12.92 ± 1.02 |
| 1000 | 3.00 | 98.37 ± 2.43 | 57.44 14.53 |

Each value is the mean±S.D. of three independent experiments. Table 3 and FIG. 6, show the percentage protection against the HSV virus at different concentrations of water extract of sweet basil. For the WEETP, the $EC_{50}$±735.70 μg/mL and for WEAT, the $EC_{50}$=812.83 μg/mL. Almost 100% protection against the HSV is achieved at 1 mg/mL for WEETP, but only about 57% protection is achieved with WEAT at this similar concentration.

Hence, this invention provides the first evidence that sweet basil, through a safe and green water extraction method, can produce an anti-viral composition that inhibits HSV replication. Their active constituents also exhibit potent antioxidant and anti-inflammatory properties. To optimize the benefits of both these activities, the final bioactive extract may consist of a mixture of the WEAT blended with the WEETP.

The resulting composition is a mixture of anti-viral and anti-oxidant ingredients to form, for example, but not limited to, a composition of a cream, lotion, liquid, spray, serum, gel, balm, lip balm, ointment, powder, pill, tablet, consumable, ingestible, patch, powder, mouthwash, toothpaste, lozenge, mint, candy, chewing gum, or similar, to treat herpes simplex virus and/or aphthous or other ulcers of the mouth.

Advantageously, the sweet basil shows effective anti-viral activity against HSV. In one embodiment, the method provides a welcome reinforcement to the existing arsenal of increasingly resistance-prone drugs, and appeals more widely to a populous increasingly looking to non-prescription treatment options, as well as to those who do not have access to doctors and therein prescription treatments, and attenuates some of the inhibition related to seeking treatment that may be associated with the stigma or embarrassment of HSV outbreaks.

Additionally, because the therapeutic treatment window for HSV lesions is small, with treatment being most effective early on, non-prescription options allow a larger segment of the population to access effective treatment. Neurotherapeutics may mean anti-viral treatment has even greater implications for both individual and societal health than merely treating HSV lesions.

Preferred embodiments of this invention are described herein, including the best mode known to the inventors for carrying out the invention. It should be understood that the illustrated embodiments are exemplary only and should not be taken as limiting the scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A method of treating or preventing herpes simplex virus (HSV), aphthous, and mouth ulcers, comprising contacting a composition with tissue, wherein the composition comprises esculentoside P, arjunglucoside I, and esculentagenic acid.

2. The method of claim 1, wherein the composition comprises one or more of the following: 3β-hydrosantamarine-1-O-β-D-glucopyranoside, 4-ethyl-paeoniflorin, apocynoside I, 3-hydroxy-4-methoxy-cinnamic acid, kaempferol-3-O-1 rutinoside, sinapic acid, apocynoside II, 3-ethoxy-4,5-dihydroxybenzoic acid, folinic acid, tryptophane, glucosyringic acid, stachyose, and raffinose.

3. The method of claim 1, wherein the composition comprises esculentoside P, arjunglucoside I, esculentagenic acid in the approximate mass ratio 1:0.2:0.2.

4. The method of claim 1, wherein the composition exhibits an $IC_{50}$ (mcg/ml) of no more than about 700.33±76.79 in a DPPH free radical scavenging assay.

5. The method of claim 1, wherein the composition comprises a total phenol content of at least about 4.14 micrograms GAE per gram of the composition.

6. A method of treating or preventing herpes simplex virus (HSV), aphthous, and mouth ulcers, comprising contacting a composition with tissue, wherein the composition comprises esculentoside P, arjunglucoside I, esculentagenic acid and hookeroside D.

7. The method of claim 6, wherein the composition comprises one or more of salvianolic acid A, salvianic acid A, rosmarinic acid, kaempferol-3-O-rutinoside, 5,6,4'-trihydroxy-7,8,3'-trimethoxyflavone, monocaffeoyltartaric acid, chicoric acid, 4-ethyl-paenoflorin, 5,6,4'-trihydroxy-7,8,3'-trimethoxyflavone, roseoside 1, quercetin-3-O-gluguronide 6'-methylester, 3-hydroxy-4-methoxy-cinnamic acid, sinapic acid, apocynoside II, 1-O-caffeoyl-β-D-glucopyranoside, tryptophane, glucosyringic acid, raffinose, stachyose, cichoriin, fraxin, and isomaltose.

8. The method of claim 6, wherein the composition comprises a total phenol content of at least about 43.22 micrograms GAE per gram of the composition.

9. The method of claim 6, wherein the composition exhibits an $IC_{50}$ (mcg/ml) of no more than about 112.33±7.64 in a DPPH free radical scavenging assay.

10. The method of claim 6, wherein the composition comprises arjunglucoside I, esculentagenic acid, and esculentoside P in the approximate mass ratio 0.19:0.07:0.03.

11. The method of claim 1 or claim 6, wherein the composition comprises one or more inactive ingredients including one or more of the following: flavorings, fillers, and stabilizers.

12. The method of claim 11, wherein the composition is in the form of a cream, lotion, liquid, emulsion, spray, serum, balm, gel, lip balm, ointment, powder, pill, tablet, consumable, ingestible, patch, powder, mouthwash, toothpaste, lozenge, mint, candy, or chewing gum.

13. The method of claim 1 or claim 6, wherein contacting the composition with the tissue comprises administering the composition to a subject.

14. The method of claim 1 or claim 6, wherein the composition comprises one or more inactive ingredients including one or more of the following: flavorings, fillers, and stabilizers, and wherein contacting the composition with the tissue comprises administering the composition to a subject.

15. The method of claim 1 or claim 6, wherein the composition comprises one or more inactive ingredients including one or more of the following: flavorings, fillers, and stabilizers, and wherein the composition is in the form of a cream, lotion, liquid, emulsion, spray, serum, balm, gel, lip balm, ointment, powder, pill, tablet, consumable, ingestible, patch, powder, mouthwash, toothpaste, lozenge, mint, candy, or chewing gum, and wherein contacting the composition with the tissue comprises administering the composition to a subject.

* * * * *